United States Patent [19]
Iijima et al.

[11] Patent Number: 5,973,726
[45] Date of Patent: *Oct. 26, 1999

[54] PANORAMIC IMAGE PROCESSING APPARATUS

[75] Inventors: Katsumi Iijima, Hachioji; Masakazu Matsugu, Chiba-ken; Kotaro Yano, Yokohama; Toshiaki Kondo, Fujisawa; Katsuhiko Mori, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/775,265

[22] Filed: Mar. 17, 1997

Related U.S. Application Data

[63] Continuation of application No. 08/303,775, Sep. 9, 1994, abandoned.

[30] Foreign Application Priority Data

Sep. 24, 1993 [JP] Japan .................................. 5-237702

[51] Int. Cl.[6] ......................................................... H04N 7/18
[52] U.S. Cl. ............................................... 348/38; 348/36
[58] Field of Search ................................. 348/36–38, 42, 348/46–48; 382/278; H04N 7/18

[56] References Cited

U.S. PATENT DOCUMENTS

| | | | |
|---|---|---|---|
| 3,580,978 | 5/1971 | Ebeling | 348/36 |
| 4,583,117 | 4/1986 | Lipton et al. | 348/47 |
| 4,727,179 | 2/1988 | Schmalfuss | 348/36 |
| 4,750,810 | 6/1988 | Tomlin et al. | 348/38 |
| 4,791,478 | 12/1988 | Tredwell et al. | 348/42 |
| 4,819,064 | 4/1989 | Diner | 348/47 |
| 4,974,073 | 11/1990 | Inova | 348/38 |
| 5,034,809 | 7/1991 | Katoh | 348/42 |
| 5,175,616 | 12/1992 | Milgram et al. | 348/47 |
| 5,394,520 | 2/1995 | Hall | 382/278 |

FOREIGN PATENT DOCUMENTS

| | | |
|---|---|---|
| 0534438 | 3/1993 | European Pat. Off. . |
| 0563737 | 10/1993 | European Pat. Off. . |

*Primary Examiner*—Richard Lee
*Attorney, Agent, or Firm*—Morgan & Finnegan LLP

[57] ABSTRACT

An apparatus has a multi-eye image pickup apparatus comprising left and right image pickup systems for picking up two images, left and right image memories for storing the left and right images picked up by the left and right image pickup systems, a corresponding point extracting portion for determining a partial image common to the left and right images from the left and right images stored in the left and right image memories, a combining conversion portion and a combined image memory for combining the left and right images to form an image, based on the result of determination by the corresponding point extracting portion, and an image outputting portion for separating the image combined by the combining conversion portion and then stored in the combined image memory, into separate images to output the separate images as images for constructing a panorama image.

6 Claims, 11 Drawing Sheets

PANORAMIC IMAGE PROCESSING APPARATUS

This is a continuation of application Ser. No. 08/303,775, filed on Sep. 9, 1994, now abandoned.

BACKGROUND OF THE INVENTION

1. Field of the Invention

The present invention relates to an image processing apparatus using an image pickup apparatus employing image pickup devices such as the CCD (charge coupled device), and more particularly to an image processing apparatus using a multi-eye image pickup apparatus consisting of a plurality of image pickup devices and imaging optical systems such as lenses, etc.

2. Related Background Art

There are recently proposed multi-eye image pickup apparatus for producing a wide panorama image or a high-definition image, having a plurality of image pickup systems each composed of an imaging optical system and an image pickup device, by which images of a common object are taken whereby image signals obtained from the respective image pickup devices are used to produce a combined image.

As a method for obtaining the panorama image there is one in which a plurality of image pickup systems simultaneously take a plurality of images different in object region, a same object existing in the images is extracted, and the images are combined based on information about relative positions between the images of the object, thus obtaining a combined panorama image. As a method for obtaining the high-definition image there is one in which a same object exiting in the images is extracted similarly as in case of the panorama image and an interpolation process is carried out based on information about relative positions in the images to newly obtain a high-definition image.

Figure 12:
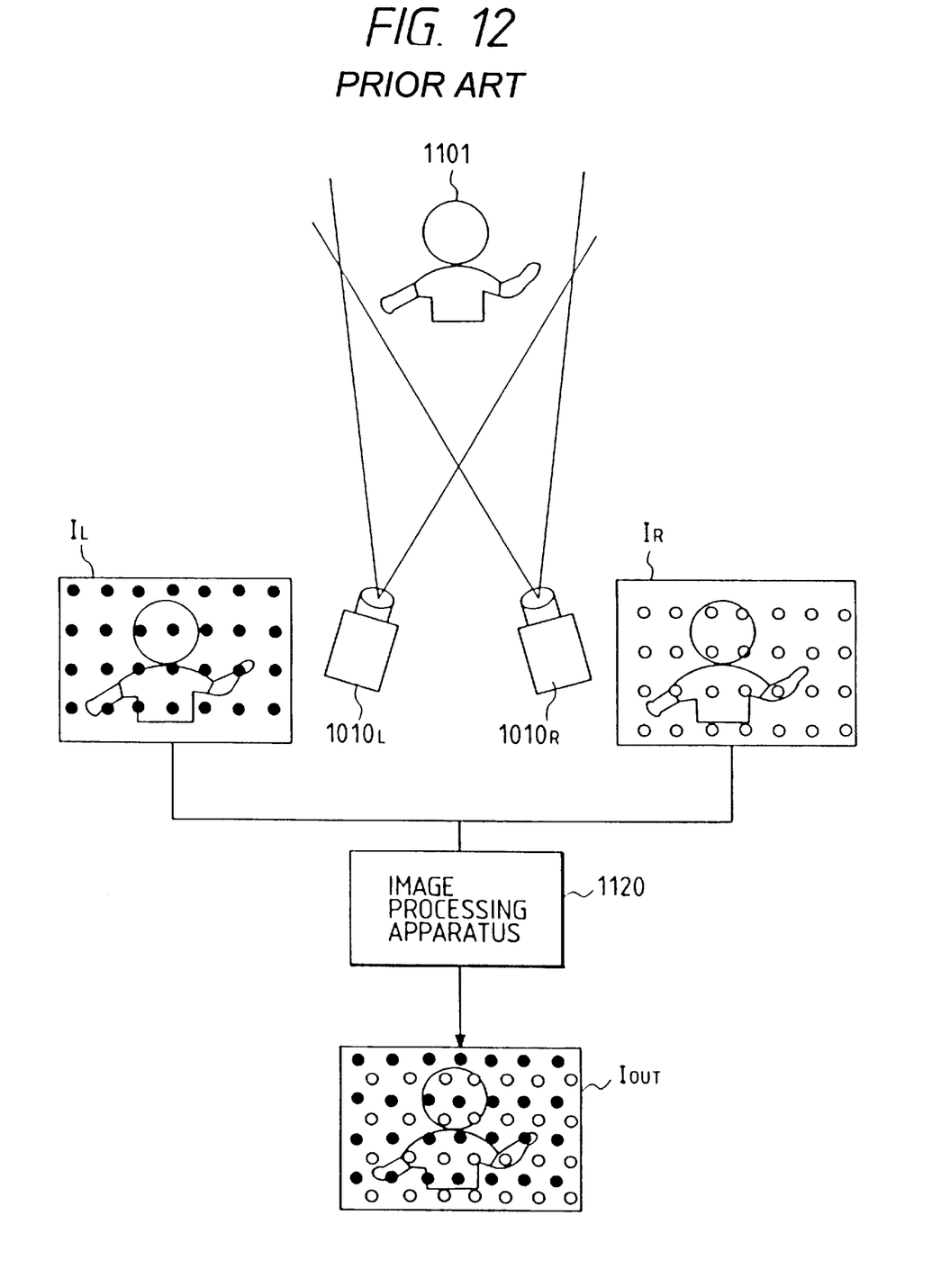
FIG. 12 is a drawing to illustrate the principle of a multi-eye image pickup apparatus which uses two image pickup systems to take images of a common object and combines the two images thus taken to obtain a high-definition image.

FIG. 12 shows an example of a multi-eye image pickup apparatus based on the principle of the method for obtaining the high-definition image, in which there are a left image pickup system $1010_L$ and a right image pickup system $1010_R$ and images of an object 1101 are taken by the left image pickup system $1010_L$ and the right image pickup system $1010_R$. An image processing apparatus 1120 performs corresponding point extraction from a left image $I_L$ obtained by the left image pickup system $1010_L$ and a right image $I_R$ obtained by the right image pickup system $1010_R$ to combine them with each other, whereby a single, higher-definition output image $I_{out}$ is obtained as compared with the image of the object taken by each single image pickup system.

SUMMARY OF THE INVENTION

The above-described multi-eye image pickup apparatus, however, had the following problems. Since the apparatus to obtain the panorama image connects a plurality of images, the resultant image is not limited to an image within the maximum angle of view of a single image pickup system. Further, a flexible image pickup apparatus can be achieved in such an arrangement that a plurality of image pickup systems are combined so as to cover a desired object region including a moving object, because a panorama image is reconstructed from a plurality of images taken at a same timing. On the contrary, the images are taken in parallel except for some overlapping portions, and rather, most of image regions are copies without any corresponding point. In this case, two corresponding objects in image connection regions could fail to coincide with each other on a produced image to be doubled like a so-called double image, thus losing continuity of images and degrading the quality of image. Therefore, discussion is focused mainly on a joint process of images. Even though these problems could have been solved to achieve the continuity of images, there had been another problem that display without losing the panorama effect was not easy as to the method for indicating on a display a panorama image with a larger angle of view than that of a single image pickup system.

In view of the above problems, an object of the present invention is to provide an image processing apparatus with excellent continuity between images to construct a panorama image and with sufficient panorama effect.

An image processing apparatus of the present invention has:

image pickup means for picking up a plurality of images;

storing means for storing the plurality of images picked up by the image pickup means;

determining means for determining a partial image common to the plurality of images stored in the storing means;

image combining means for combining the plurality of images to obtain an image, based on a determination result of the determining means; and image outputting means for splitting the image combined by the image combining means into a plurality of images to output them.

It is preferred that the image pickup means be a multi-eye camera, that the image combining means extract pairs of corresponding points for a same portion of an object from the images stored in the storing means to synthesize a single image, based on the thus extracted pairs of corresponding points, thus making connection between two images excellent, or that the image outputting means split the combined image into split images so that the split images have a region common thereto.

The image combining means properly forms a combined image from the plurality of images taken by the image pickup means, based on the determination by the determining means. The combined image formed by the image combining means is split by the image outputting means so as to form a natural panorama image and the split images are output as those for constructing the panorama image. Accordingly, the natural panorama image can be constructed by combining the split images with each other.

DETAILED DESCRIPTION OF THE PREFERRED EMBODIMENTS

Figure 1:
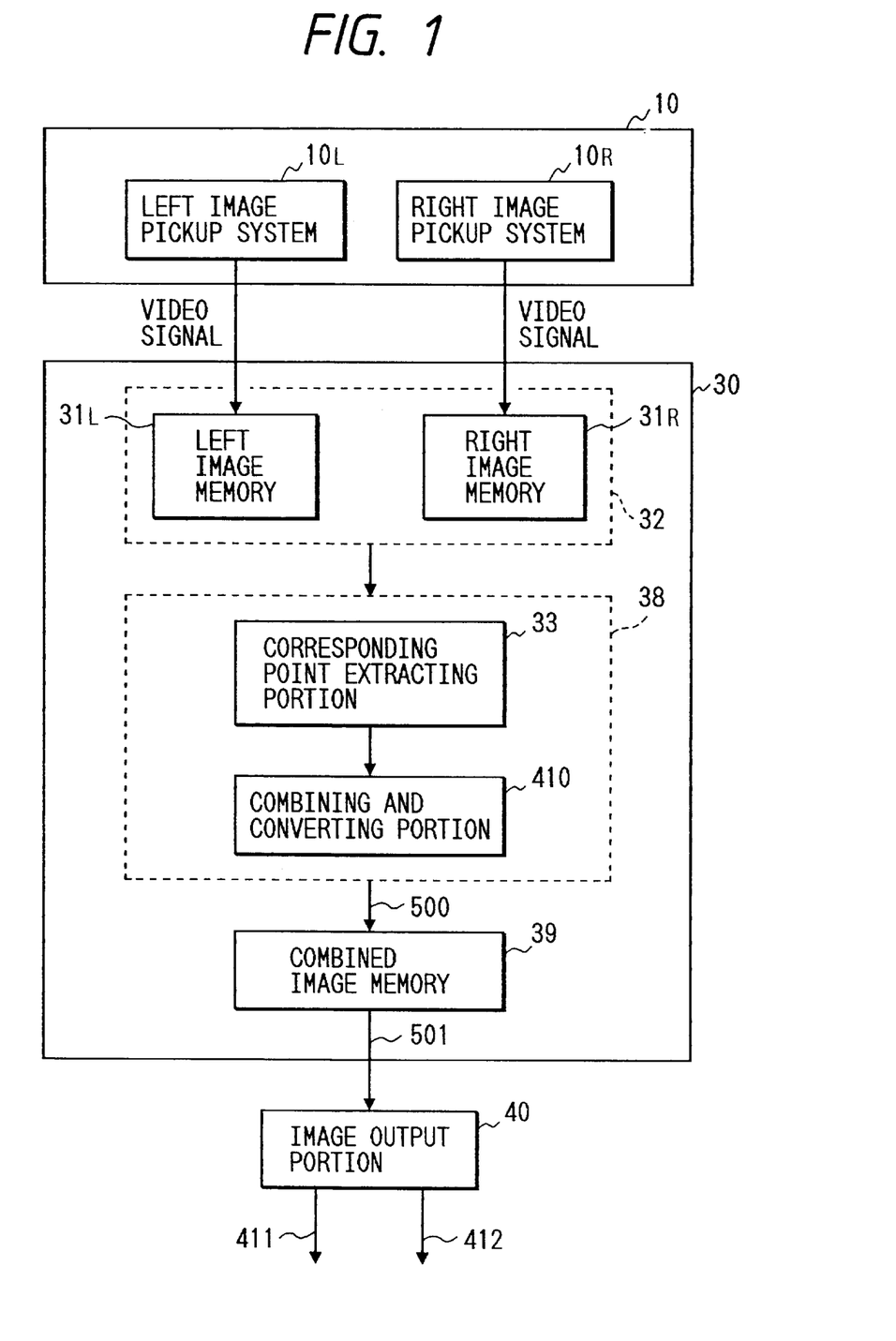
FIG. 1 is a block diagram to show an embodiment of an image processing apparatus of the present invention.
Figure 2:
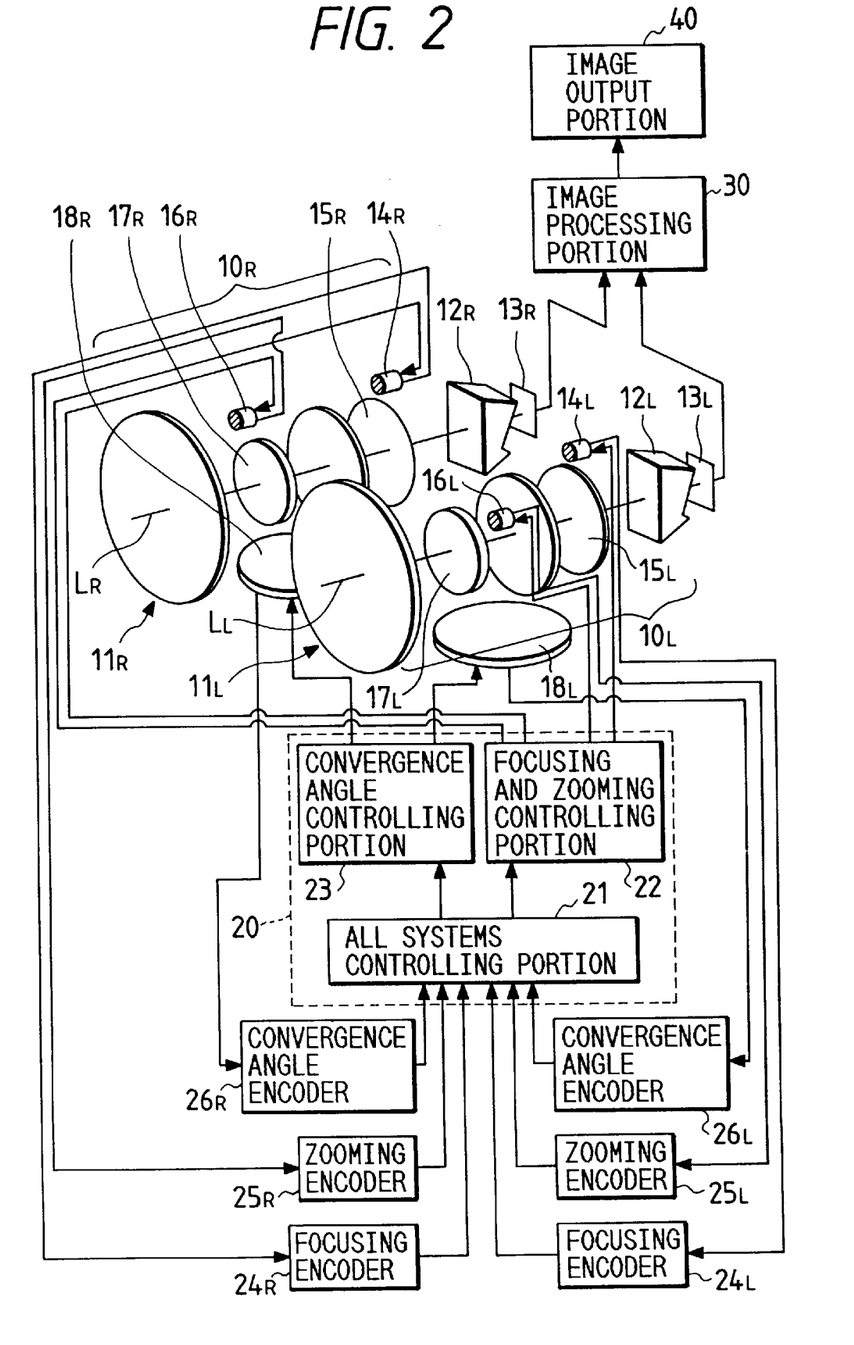
FIG. 2 is a constitutional drawing to show the structure of a multi-eye image pickup apparatus in the embodiment of FIG. 1.

Embodiments of the present invention will be described with reference to the drawings. FIG. 1 is a block diagram to show the first embodiment of an image processing apparatus of the present invention, and FIG. 2 is a constitutional drawing to show the structure of a multi-eye image pickup apparatus in the embodiment of FIG. 1. As seen from FIG. 1, the present embodiment is composed of a multi-eye image pickup apparatus 10 for outputting video signals from a left image pickup system $10_L$ and a right image pickup system $10_R$, an image processing portion 30 for processing the video signals output from the multi-eye image pickup apparatus 10 to output the processed signals, and a split image processing and outputting portion 40 for splitting an image 501 output from the image processing portion 30 into two images (411, 412), in which the two image pickup systems of the right image pickup system $10_R$ and the left image pickup system $10_L$ are used to take two images and the two images thus taken are connected in parallel to obtain a single panorama combined image.

The multi-eye image pickup apparatus 10 is next described referring to FIG. 2. First described is the left image pickup system $10_L$. The left image pickup system $10_L$ has an image pickup lens group $11_L$ as an imaging optical system incorporated in a lens barrel (not shown), a color separation prism $12_L$ mounted to the image pickup lens group $11_L$, for separating light from an object into three primary colors, and three CCD sensors $13_L$ (only one of which is shown) as image pickup devices for the respective colors separated by the color separation prism $12_L$, each having a rectangular, effective, light-receiving portion.

The image pickup lens group $11_L$ is composed of a plurality of lenses including a focusing lens group $15_L$ driven by a focusing motor $14_L$ and a zooming lens group $17_L$ driven by a zooming motor $16_L$. Each motor $14_L$, $16_L$ is actuated according to a control signal from an overall control portion 21 and a focus and zoom control portion 22 in a control unit 20 for controlling the optical system.

On the other hand, the right image pickup system $10_R$ is constructed in the same manner as the left image pickup system $10_L$, and the optical axis $L_R$ of the image pickup lens group $11_R$ in the right image pickup system $10_R$ is arranged as included in a plane including the optical axis $L_L$ of the image pickup lens group $11_L$ in the left image pickup system $10_L$.

Further, each lens barrel in which each image pickup lens group $11_L$, $11_R$ is incorporated is connected with a rotational shaft of a convergence angle motor $18_L$, $18_R$ actuated according to a control signal from a convergence angle controlling portion 23 in the control unit 20. The rotational shafts of the convergence angle motors $18_L$, $18_R$ extend in the direction perpendicular to the plane including the optical axes $L_L$, $L_R$ of the image pickup lens groups $11_L$, $11_R$. Driving each convergence angle motor $18_L$, $18_R$, the image pickup lens group $11_L$, $11_R$ is rotated together with the color separation prism $12_L$, $12_R$ and the CCD sensors $13_L$, $13_R$ mounted thereto, thereby setting an angle (convergence angle) between the optical axes $L_L$ and $L_R$ of the image pickup lens groups $11_L$, $11_R$.

In addition, each image pickup system $10_L$, $10_R$ is provided with a focusing encoder $24_L$, $24_R$ for detecting a position of the focusing lens group $15_L$, $15_R$, a zooming encoder $25_L$, $25_R$ for detecting a position of the zooming lens group $17_L$, $17_R$, and a convergence angle encoder $26_L$, $26_R$ for detecting the convergence angle. These encoders may be replaced, for example, by external members such as potentiometers or by those for detecting respective positions and angles from signal information supplied from the drive system itself, such as pulse motors.

Next described referring to FIG. 1 are the image processing portion 30 and image outputting portion 40 presenting the features of the present invention. An image input portion 32 stores the video signals as image signals from the CCD sensors $13_L$, $13_R$ (FIG. 2) in the image pickup systems $10_L$, $10_R$, in a left image memory $31_L$ and in a right image memory $31_R$, respectively. An image converting portion 38 produces a combined image, based on the left and right images stored in the left image memory $31_L$ and the right image memory $31_R$ in the image input portion 32. A combined image memory 39 retains the image 500 combined by the image converting portion 38 and outputs it to the image output portion 40. The image converting portion 38 in the present embodiment is composed of a corresponding point extracting portion 33 for extracting pairs of corresponding points between the two images from the two images put into the image input portion 32, and a combining conversion portion 410 for calculating a three-dimensional position (distance information) of each corresponding point pair from the results of extraction of corresponding point pairs and combining the images, based on the thus calculated information.

Figure 3:
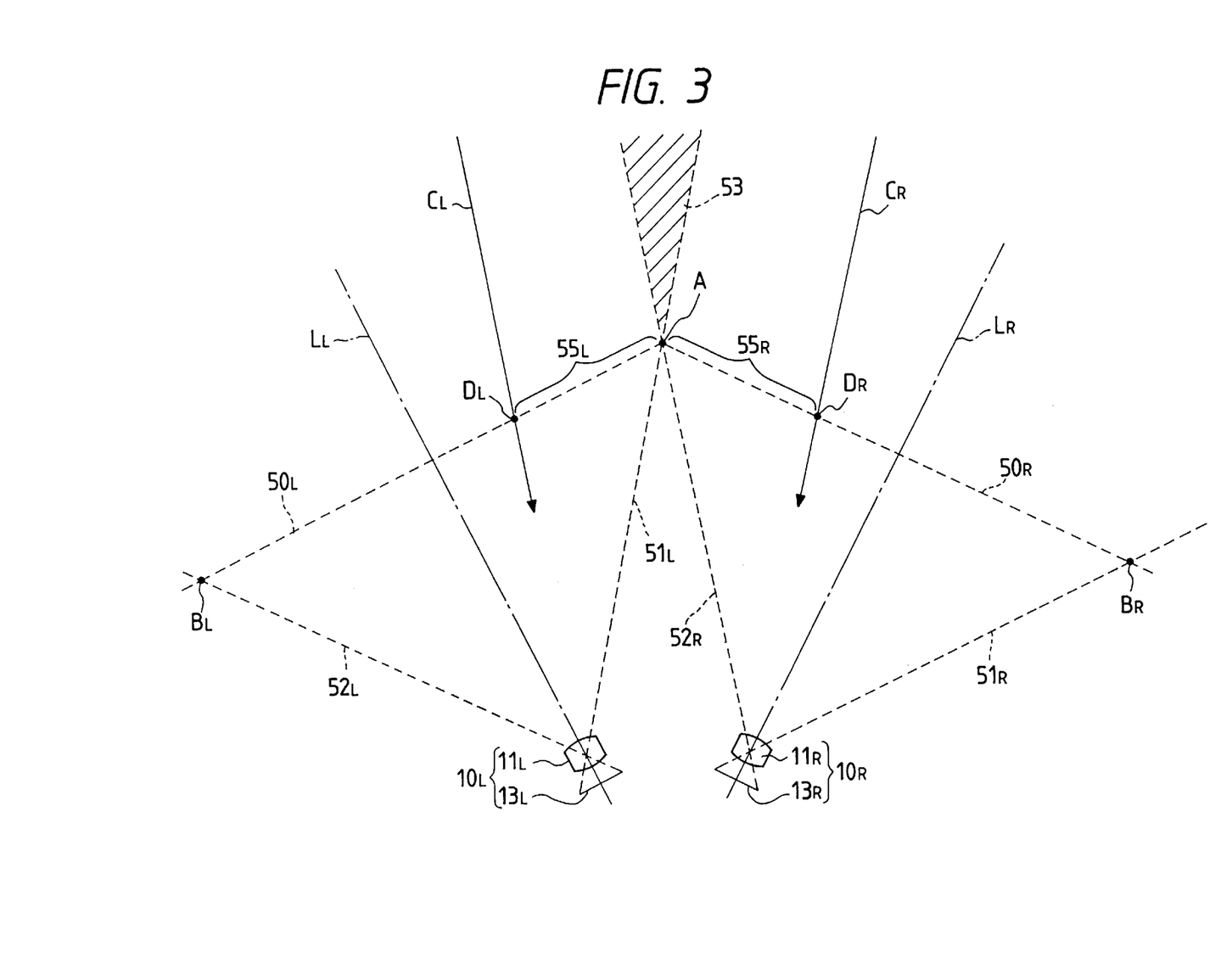
FIG. 3 is a drawing to show main part of optical systems in the multi-eye image pickup apparatus shown in FIG. 2, which is viewed in a direction perpendicular to a plane including the optical axes of image pickup lens groups.

FIG. 3 is a drawing to show main part of the optical systems in the multi-eye image pickup apparatus shown in FIG. 2, which is observed in the direction perpendicular to the plane including the optical axes $L_L$, $L_R$ of the image pickup lens groups $11_L$, $11_R$. To simplify the description, the portions of the color separation prisms $12_L$, $12_R$ (FIG. 2) are omitted and only one sensor is shown for each of the left and right CCD sensors $13_L$, $13_R$. As shown in FIG. 3, the image pickup lens group $11_R$ and CCD sensor $13_R$ in the right image pickup system $10_R$ have a focused object plane $50_R$ and a photographable region is limited to a region between an end plane $51_R$ and an end plane $52_R$ because of the effective, light-receiving portion of the CCD sensor $13_R$. Therefore, an effective object region is the region between a line of intersection $B_R$ and a line of intersection A on which the focused object plane $50_R$ intersects with the end plane $51_R$ and the end plane $52_R$, respectively. Similarly, for the left image pickup system $10_L$, an effective object region is the region between the line of intersection A and a line of intersection $B_L$ on a focused object plane $50_L$.

The focusing motors $14_L$, $14_R$ (FIG. 2) and the zooming motors $16_L$, $16_R$ (FIG. 2) in the left and right image pickup systems $10_L$, $10_R$ are so controlled as to keep the distances between the focused object plane $50_L$, $50_R$ and the CCD sensor $13_L$, $13_R$ equal to each other and as to keep the magnification of image of the left system equal to that of the right system. Further, the convergence angle motors $18_L$, $18_R$ (FIG. 2) are so controlled that the edges of the effective object regions of the respective image pickup systems $10_L$, $10_R$ coincide with each other on the line of intersection A. A control of each motor $14_L$, $14_R$, $16_L$, $16_R$, $18_L$, $18_R$ is performed through the control unit 20 (FIG. 2) receiving a signal from each encoder $24_L$, $24_R$, $25_L$, $25_R$, $26_L$, $26_R$ (FIG. 2). Particularly, the convergence angle motors $18_L$, $18_R$ are controlled in connection with signals representing the position of the focused object plane $50_L$, $50_R$ and the position of the edge of the effective object region, calculated with output signals from the focusing encoders $24_L$, $24_R$ and from the zooming encoders $25_L$, $25_R$.

The procedure of the portion of the combining process is next described briefly. The corresponding point extracting portion 33 shown in FIG. 1 extracts pairs of corresponding points between the images. A typical technique for extraction is the template matching method. In this method, a template is set around a point in the left image, for example, and a corresponding point thereto is determined by comparison of similarity in the right image with the template image. The correlation method is one of methods for comparison of similarity, in which a correlation is taken between a pixel value in the image of template and a pixel value in a searching image and a corresponding point is determined as coordinates giving the maximum value. The relation is represented by the following formula (1).

$$\sigma(m_R, n_R, m_L, n_L) = \frac{\sum_{i,j} R(m_R - i, n_R - j) \cdot L(m_L + i, n_L + j)}{\sqrt{\sum_{i,j} R^2(m_R - i, n_R - j)} \cdot \sqrt{\sum_{i,j} L^2(m_L + i, n_L + j)}} \quad (1)$$

Figure 4A:
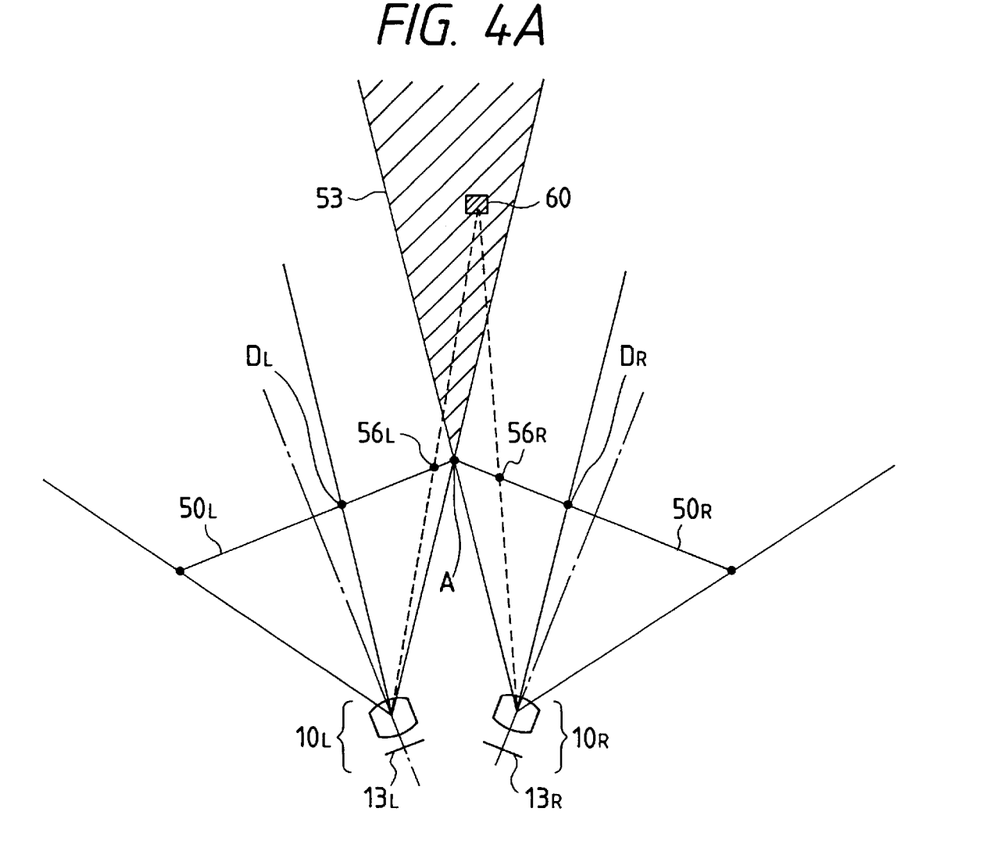
FIG. 4A is a drawing to illustrate a positional relation of an object as taken by the multi-eye image pickup apparatus shown in FIG. 2, which shows a position of the object as observed in the direction perpendicular to the plane including the optical axes of the image pickup lens groups.
Figure 4B:
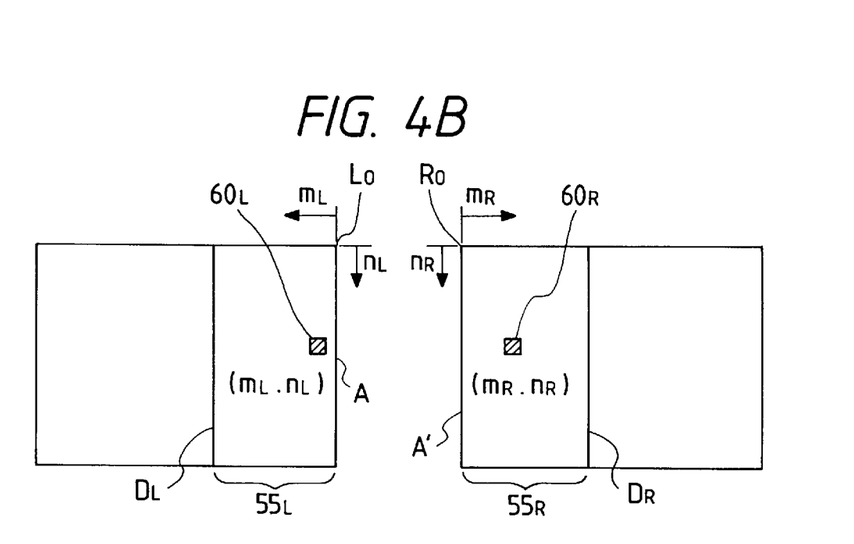
FIG. 4B is a drawing to show effective light-receiving portions of left and right CCD sensors in FIG. 4A as observed from the image pickup lens group side.

In the formula (1), R $(m_R, n_R)$ or L $(m_L, n_L)$ represents a pixel value in the right or left image, and $\sigma$ $(m_R, n_R, m_L, n_L)$ the degree of correlation. Also, $m_R$, $n_R$, $m_L$, $n_L$ are coordinate values of pixel. The reason why the signs before i and j in the square sum or in the product sum for the left image are opposite to those for the right image is that the pixel coordinate axes shown in FIG. 4B are defined to be in mirror symmetry with each other. The maximum value is 1 for the normalized correlation of the formula (1).

Figure 5:
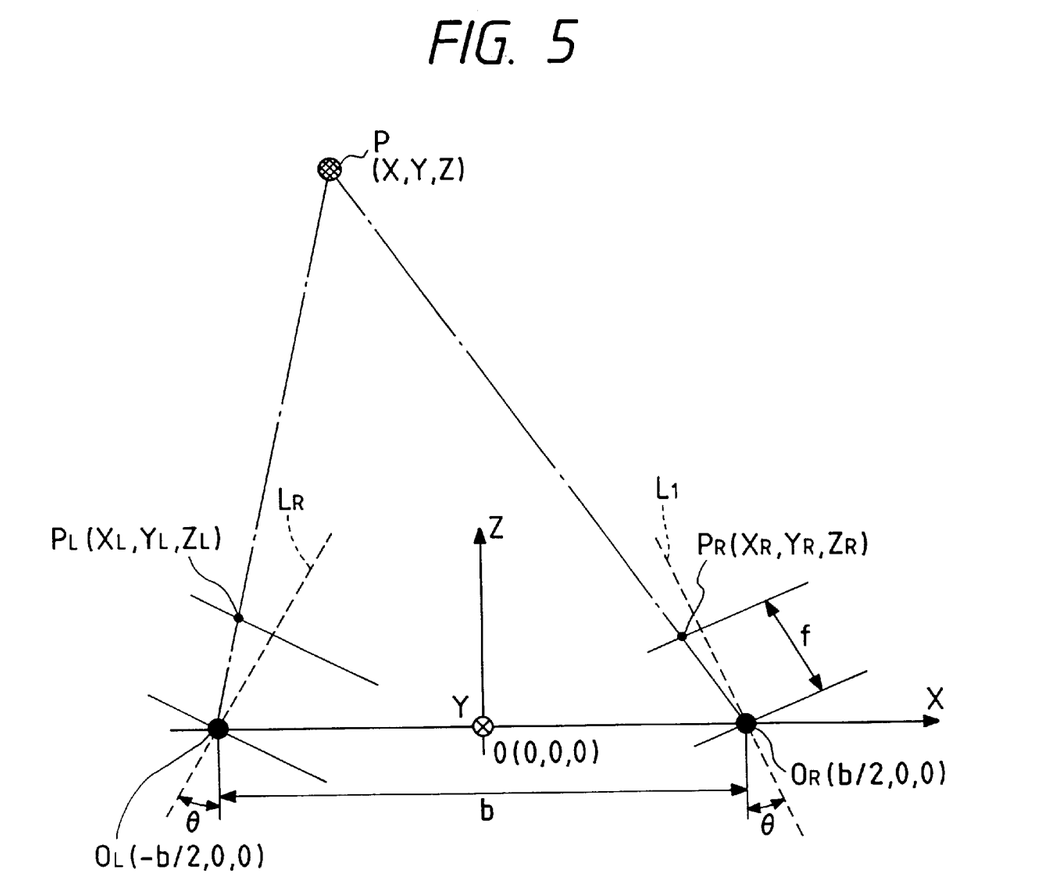
FIG. 5 is a drawing to illustrate the method of triangulation.

From the obtained information about corresponding points, a position in the three-dimensional space is obtained for each corresponding point pair by the triangulation method. As shown in FIG. 5, the center points $O_L$, $O_R$ of the object-side principal planes of the left and right image pickup lens groups $11_L$, $11_R$ (FIG. 3) are located in line symmetry with respect to the Z-axis on the X-axis and a length of the base line connecting the center points $O_L$, $O_R$ is defined as a base length b. Then the coordinates of the center points $O_L$, $O_R$ are represented by (−b/2,0,0) and (b/2,0,0), respectively.

When a point P in the three-dimensional space is projected toward each center point $O_L$ or $0_R$, a projected point on each of the left and right CCD sensors $13_L$, $13_R$ is $P_L$ or $P_R$, respectively. Coordinates of the points P, $P_L$, $P_R$ are represented by (X,Y,Z), $(X_L,Y_L,Z_L)$, and $(X_R,Y_R,Z_R)$, respectively. Here, a plane including the three points of P, $P_L$, $P_R$ in the three-dimensional space is called as an epipolar plane, and a line of intersection between the epipolar plane and a CCD sensor surface is called as an epipolar line. Then the coordinates (X,Y,Z) of the point P are given by the following formulas (2), (3), (4), respectively.

$$X = (b/2) \cdot \frac{\{X_L + (b/2)\}/Z_L + \{X_R - (b/2)\}/Z_R}{\{X_L + (b/2)\}/Z_L - \{X_R - (b/2)\}/Z_R} \quad (2)$$

$$Y = \frac{Y_R}{Z_R} \cdot Z = \frac{Y_L}{Z_L} \cdot Z \quad (3)$$

$$Z = \frac{b}{\{X_L + (b/2)\}/Z_L - \{X_R - (b/2)\}/Z_R} \quad (4)$$

Let θ be an angle which the optical axis $L_L$, $L_R$ of each of the left and right image pickup lens groups $11_L$, $11_R$ makes with a straight line passing through the center point $O_L$, $O_R$ of the object-side principal plane and parallel to the Z-axis (which is called as a convergence angle), and f be a focal length of each image pickup lens group $11_L$, $11_R$. Then the following relations of formulas (5) and (6) hold.

$$Z_R = \{X_R - (b/2) + f \sin(\theta)\} \tan(\theta) + f \cos(\theta) \quad (5)$$

$$Z_L = -\{X_L + (b/2) - f \sin(\theta)\} \tan(\theta) + f \cos(\theta) \quad (6)$$

The coordinates (X,Y,Z) of the point P are obtained by the above formulas (2) to (6). Based on these coordinates, coordinate transformation is carried out into an image as seen from a certain visual point, for example, into an image as seen from a middle point between the two cameras. A combined image is obtained by a combination of translational transformation and rotational transformation.

The combined image is obtained as described above. Next described is how to output the thus obtained image in an appropriate manner, for example, how to output the image to a head-mounted display (HMD) having a plurality of displays. Let us assume in this description that the two images are constructed in the format of NTSC. There are a variety of typical NTSC signals having pixels of 525×910, 480× 640, 480×720, 480×768, etc., which are called totally as the NTSC signal herein.

Figure 6:
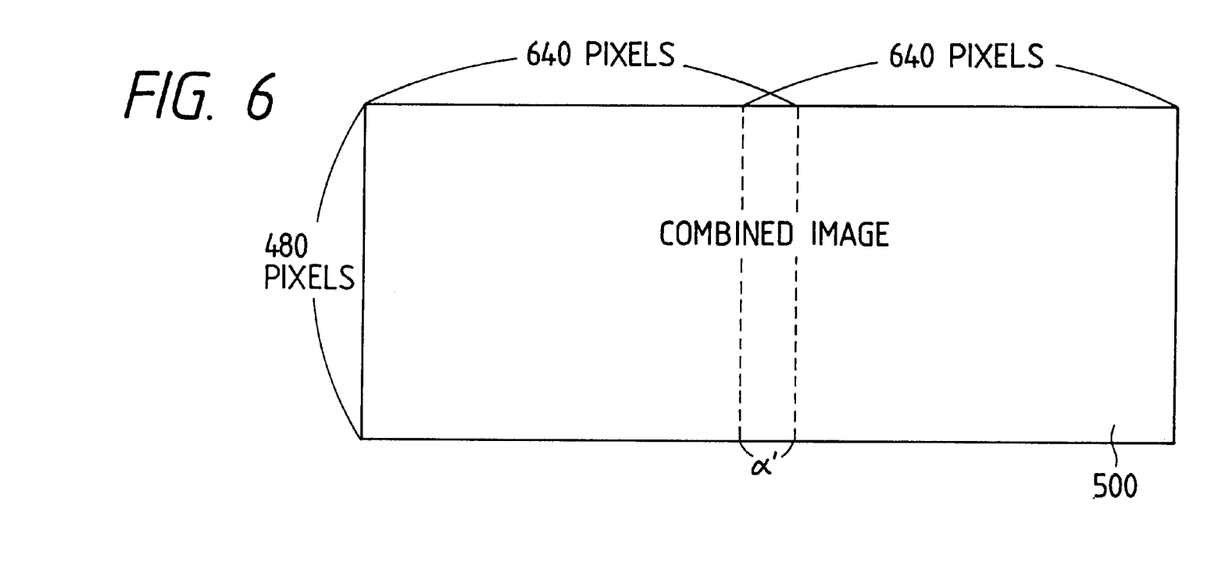
FIG. 6 is a schematic drawing to show a combined image.

Let us consider an example of 480×640 and suppose that the size of the region of the overlapping portions in taking images is α pixels in the horizontal direction. In this case, the aspect ratio of the combined image is approximately 480:(640+640−α') as shown in FIG. 6. Here, α' is employed, because α is somewhat changed by the combining process. In the extreme case the two images are taken in fit at the joint without losing any part. In that case, α'=α=0, whereby 480:(640+640−α)=3:8.

Figure 7:
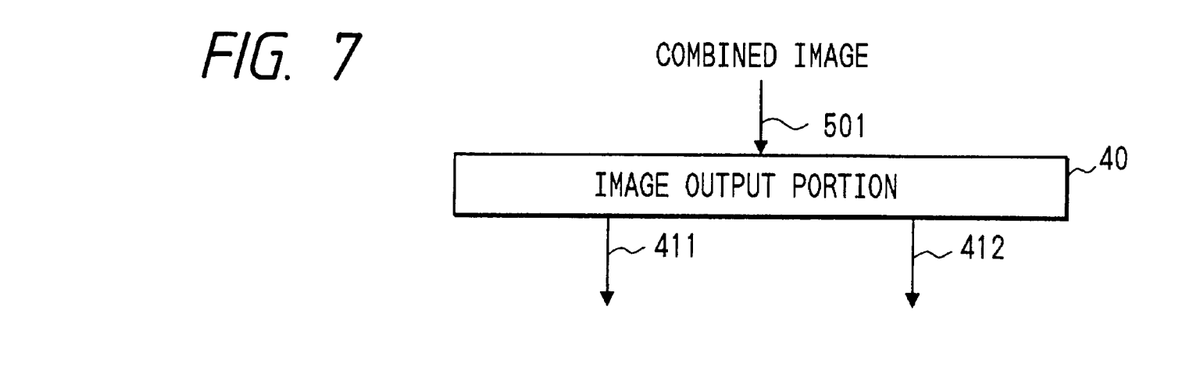
FIG. 7 is a block diagram to illustrate input and output of an image output portion.

In order to indicate the image on the displays in the HMD or the like, the combined image 501 obtained first needs to be divided into a plurality of images by the image output portion 40, as shown in FIG. 7. Separate images are output as image signals 411 and 412.

Figure 8:
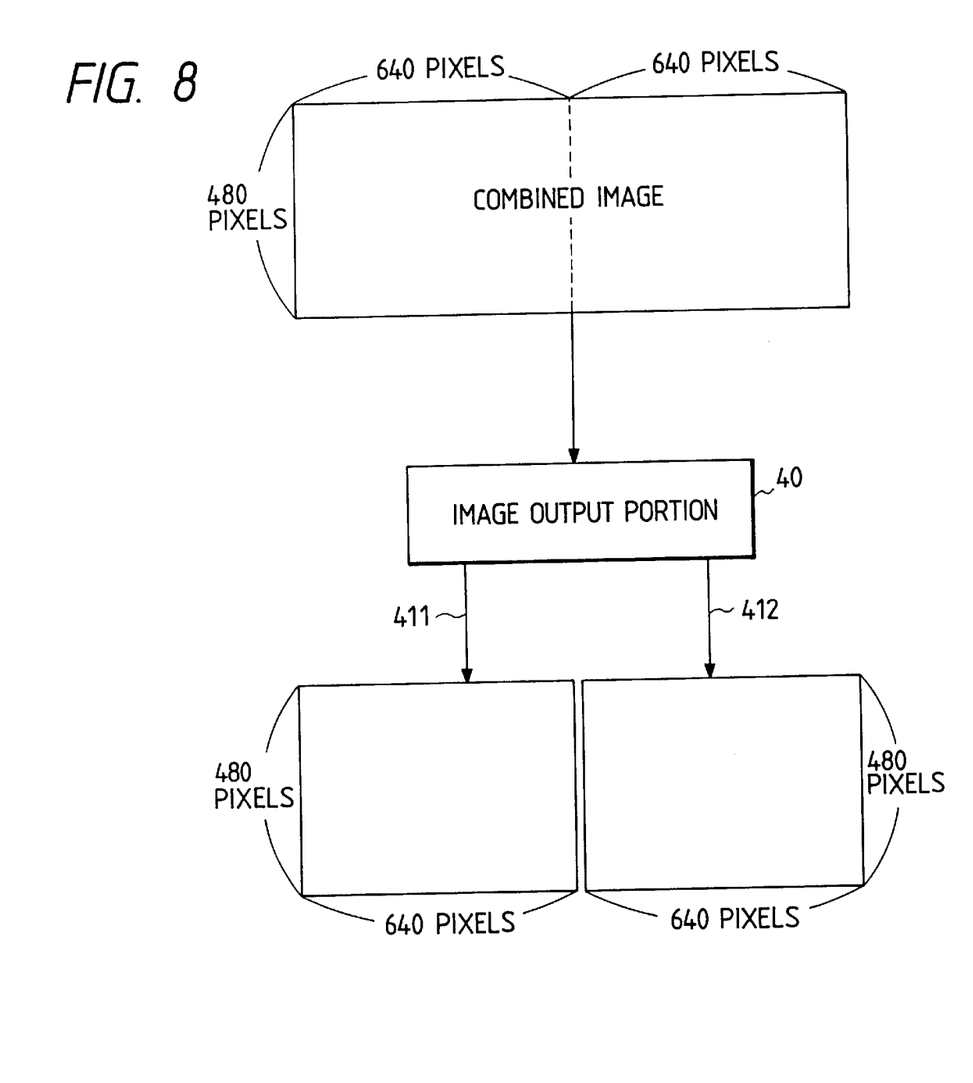
FIG. 8 is a drawing to illustrate a method of separation output in which the image output portion of FIG. 7 separates the combined image into separate images.

For example, in case of the above example, two images with a ratio of 4:3 are produced as shown in FIG. 8, that is, the image of 8:3 is separated into two to produce two NTSC image signals of 4:3. Then the two images are transmitted to the displays in the HMD or the like. Consequently, using the two screens, the images can be indicated with a wide angle of view and with full of presence.

Figure 9:
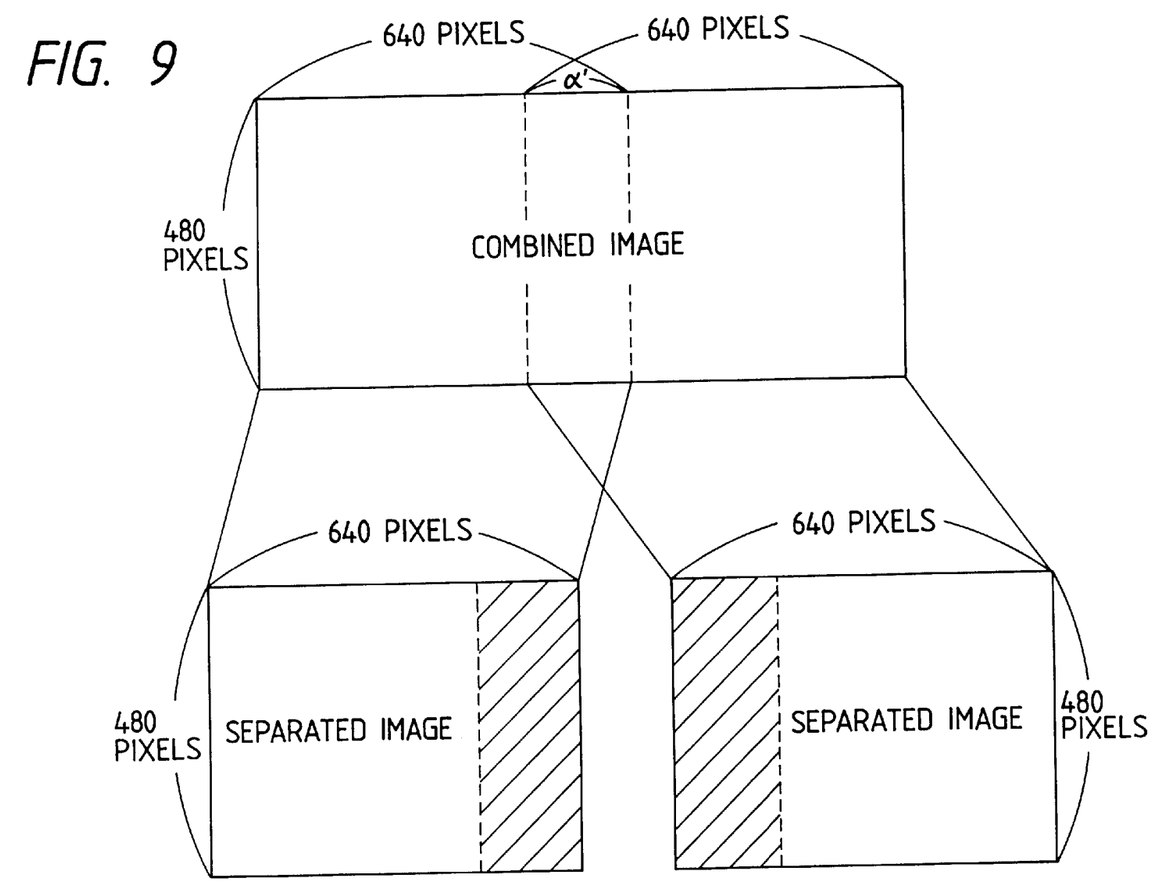
FIG. 9 is a drawing to illustrate another method of separation output of a combined image obtained taking overlapping portions α' into consideration in combining images.

Although it was assumed in the above example that α=0 for the overlapping portions, it is general that α>0. In that case, two image signals as shown in FIG. 9 are produced from the image of 480:(640+640−α'). The aspect ratio of the produced images is 3:4. Namely, the images are of 480:640.

Further describing it to avoid misunderstanding, the two image signals thus obtained are different from the original image signals obtained through the two image pickup systems, because the images in the overlapping portions were subjected to the transformation in the combining process portion. There is of course a case that the transformation causes no change of images taken under certain conditions, for example, a case that a plane object is taken under the infinity setting.

The thus obtained image signals of 480:640 are indicated on the two displays in the HMD or the like, whereby they can be indicated as a panorama image. In this case, the two images include the same part when displayed. Since the overlapping portions (the hatched portion in FIG. 4A) in the two images retain no stereoscopic parallax information because of the preceding combining process, the images from the two overlapping portions are fused as to be captured as a plane without perception of stereoscopic effect and are merged with the images in the non-overlapping portions to widen the angle of view, presenting a total indication of a panorama image. In case of the displays in the HMD or the like, the indication with the same portions (the hatched portion) in FIG. 4A is rather preferred, because a desired image can be indicated further suppressing visual recognition of the edges or the like at the joint.

Figure 10:
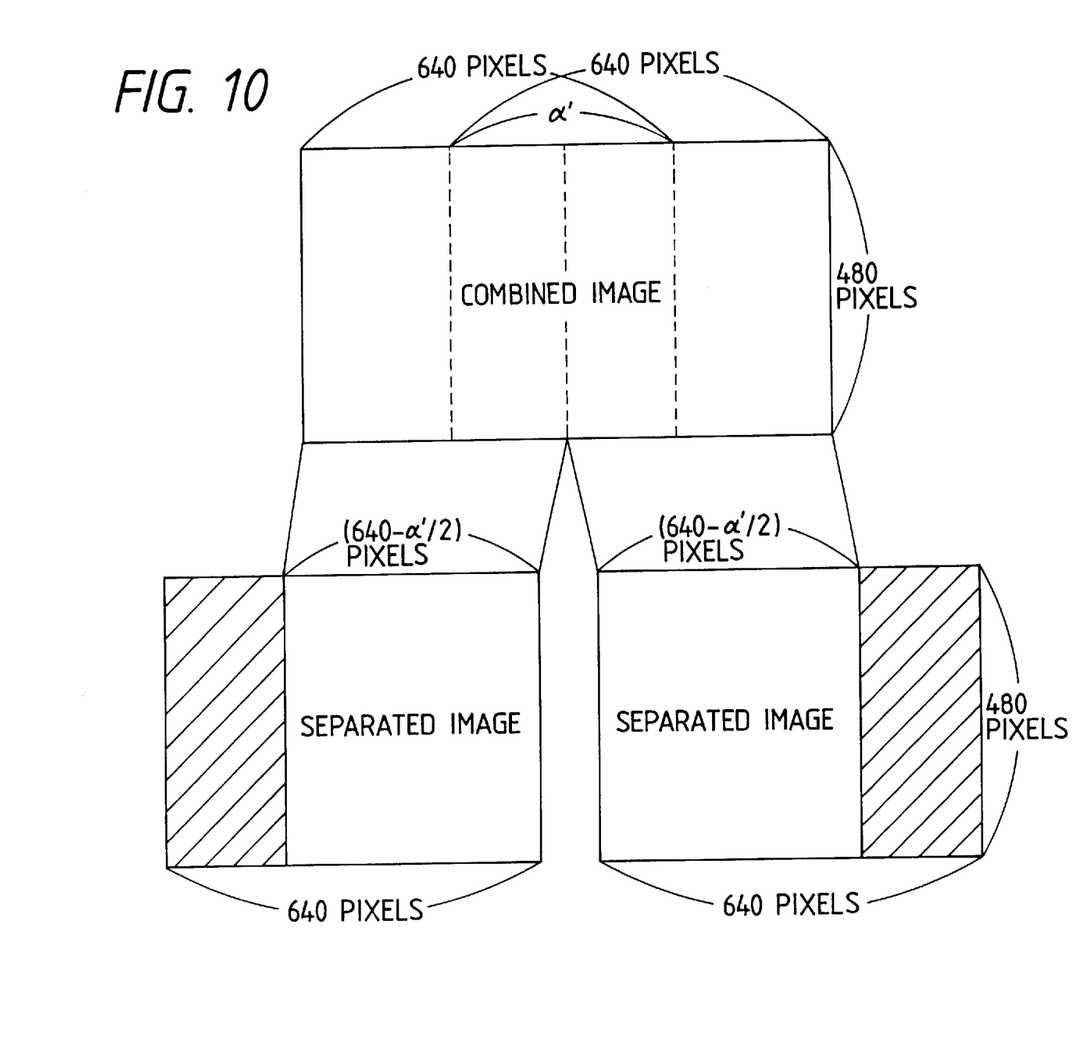
FIG. 10 is a drawing to illustrate another method of separation output, similar to FIG. 9, which indicates a case in which indicated images have no overlapping portion.

The second embodiment is an example in which two image signals as shown in FIG. 10 are produced. In this case, the split signal image processing portion generates image signals so that the two images are indicated without positive provision of a same portion. Accordingly, an image, for example, of a black level is inserted in a region of the hatched portion 480×α'/2 in FIG. 10 in one image and a half of the combined image is indicated in the portion of 480× (640−α'/2).

In case of the present embodiment, the images are indicated in the same manner as in the case of α'=α=0 in the first embodiment. Since there is no same image between the two displays, the border could be somewhat recognizable in perception of human because of absence of the fused region. The present embodiment still has the same effect of widening the angle of view.

Figure 11:
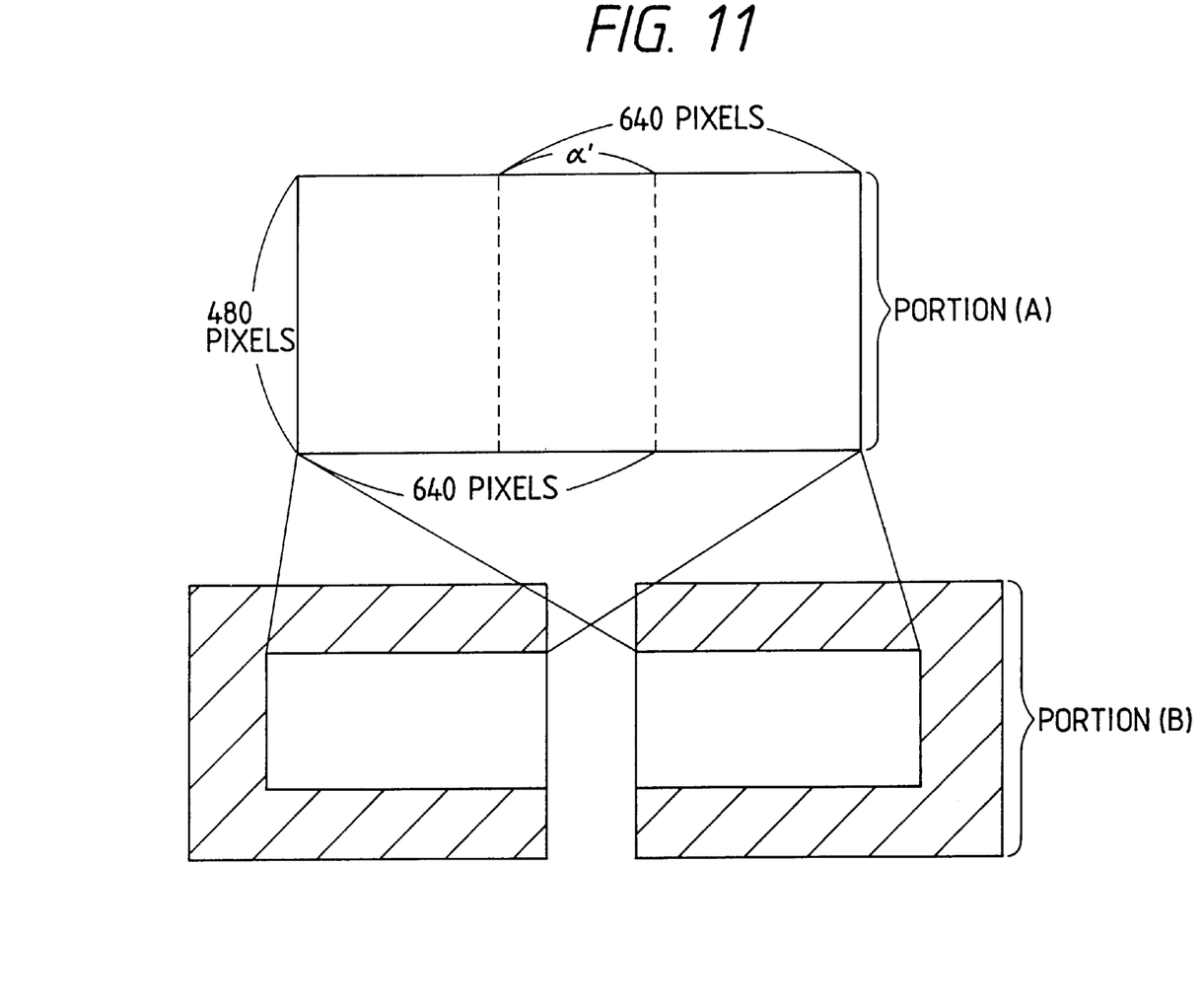
FIG. 11 is a drawing to illustrate an example in which a combined image is to be displayed on two screens as two separate images with a same aspect ratio.

The third embodiment is an example in which a same region is positively taken in for the two displays. Namely, the split image signal processing portion splits the combined image of 480×(640+640−α') put there into two image signals of 240×{(640 +640−α')/2} with a same aspect ratio and a size of pixels which can be set in a display. FIG. 11 shows the state. The portion (A) in FIG. 11 shows an input combined image and the portion (B) in FIG. 11 shows two separate image signals to be output. In the portion (B) in FIG. 11 the hatched portions represent regions in which image signals, for example, of the black level are inserted.

Although the above-described examples were described as the typical examples of 640×480 images of the NTSC signal and the figures also showed the images, it is of course that the present invention is by no means limited to the examples. The same can be applied to the format of PAL and the formats of EDTV and HDTV. Also, the invention can be applied to the formats other than those. Further, the invention was described with the examples of the displays in the HMD, but the invention is by no means limited to the displays in the HMD.

As described above, the present invention has the following effects by the provision of the image combining means for forming a panorama image and the image output means for properly splitting the combined panorama image into split images to output them.

An obtained image is excellent near the connection between the two images by the arrangement that the corresponding point pairs for a same portion of an object are extracted from the image signals and the combining transformation is carried out based on the corresponding point pairs thus extracted. Further, the image output portion separates the image into desired image segments, so that the thus separated images can be indicated on a plurality of displays, enjoying an effect of presenting a smooth panorama image.

What is claimed is:

1. An image processing apparatus comprising:

first and second image pickup means used for panorama image pickup;

first storing means for storing a first image picked up by said first image pickup means;

second storing means for storing a second image picked up by said second image pickup means;

corresponding point extracting means for extracting corresponding points between said first and second images in an overlapping area of said first and second images respectively stored by said first and second storing means;

panorama image combining means for forming a panorama image by combining said first and second images on the basis of information of the corresponding points extracted by said corresponding point extracting means, said panorama image being formed as a plane image from a virtual view point between a photographic view point of said first image pickup means and a photographic view point of said second image pickup means;

panorama image storing means for storing said panorama image combined by said panorama image combining means; and image outputting means for dividing said panorama image stored by said panorama image storing means into first and second display images to be output in parallel, wherein said panorama image includes a common area, a first area and a second area, said first display image is so formed as to include said common area and said first area of said panorama image by trimming said panorama image, and said second display image is so formed as to include said common area and said second area of said panorama image by trimming said panorama image.

2. The apparatus according to claim 1, wherein said panorama image has a center area, a first periphery area existing at one side of said center area and a second periphery area existing at the other side of said center area and said image outputting means divide said panorama image into said first and second display images so that said first display image has said first periphery area and said center area of said panorama image and said second display image has said second periphery area and said center area of said panorama image.

3. The apparatus according to claim 1 further comprising head mounted display means, wherein said head mounted display means displays said first and second display images.

4. An image processing method comprising the steps of:

performing panorama-image pickup by using first and second image pickup means;

storing in a first storing means a first image picked up by said first image pickup means;

storing in a second storing means a second image picked up by said second image pickup means;

performing extraction of corresponding points between said first and second images in an overlapping area of said first and second images respectively stored by said first and second storing means by corresponding point extracting means;

forming a panorama image by combining said first and second images on the basis of information of said corresponding points extracted by said corresponding point extracting means by panorama image combining means, said panorama image being formed as a plane image from a virtual view point between a photographic view point of said first image pickup means and a photographic view point of said second image pickup means;

storing in a panorama image storing means said panorama image combined by said panorama image combining means; and dividing said panorama image stored by said panorama image storing means into first and second display images and outputting in parallel said first and second display images by image outputting means, wherein said panorama image includes a common area, a first area and a second area, said first display image is so formed as to include said common area and said first area of said panorama image by trimming said panorama image, and said second display image is so formed as to include said common area and said second area of said panorama image by trimming said panorama image.

5. The method according to claim 4, wherein said panorama image has a center area, a first periphery area existing at one side of said center area and a second periphery area existing at the other side of said center area and said image outputting means divide said panorama image into said first and second display images so that said first display image has said first periphery area and said center area of said panorama image and said second display image has said second periphery area and said center area of said panorama image.

6. The method according to claim 4, wherein said first and second display images are displayed by a head mounted display.

* * * * *

UNITED STATES PATENT AND TRADEMARK OFFICE
CERTIFICATE OF CORRECTION

PATENT NO. : 5,973,726
DATED : October 26, 1999
INVENTOR(S) : Katsumi Iijima et al.

It is certified that error appears in the above-identified patent and that said Letters Patent is hereby corrected as shown below:

Column 5, line 49, after before delete "i and j" and insert therefor -- $\underline{i}$ and $\underline{j}$ --.

Column 5, line 63, after "length" delete "b" and insert therefor -- $\underline{b}$ --.

Column 6, line 52, after "because" delete "a is" and insert therefor -- $\alpha$ is --.

Column 7, line 50, delete "there into" and insert therefor -- thereinto --.

Signed and Sealed this

Seventeenth Day of April, 2001

Attest:

NICHOLAS P. GODICI

*Attesting Officer*  *Acting Director of the United States Patent and Trademark Office*